(12) United States Patent
Pan et al.

(10) Patent No.: US 9,239,879 B2
(45) Date of Patent: Jan. 19, 2016

(54) METHOD AND SYSTEM FOR DETERMINING CONFIDENCE IN ANSWER FOR SEARCH

(75) Inventors: Yufei Pan, North Brunswick, NJ (US); Hui Li, Edison, NJ (US); Justin Sarma, New York, NY (US); David Soukal, Bothell, WA (US); Alessio Signorini, Boulder, CO (US); Apostolos Gerasoulis, Edison, NJ (US); Tomasz Imielinski, Princeton, NJ (US)

(73) Assignee: IAC Search & Media, Inc., Oakland, CA (US)

( * ) Notice: Subject to any disclaimer, the term of this patent is extended or adjusted under 35 U.S.C. 154(b) by 597 days.

(21) Appl. No.: 12/493,097

(22) Filed: Jun. 26, 2009

(65) Prior Publication Data

US 2010/0332499 A1 Dec. 30, 2010

(51) Int. Cl.
*G06F 7/00* (2006.01)
*G06F 17/30* (2006.01)

(52) U.S. Cl.
CPC ...... *G06F 17/30864* (2013.01); *G06F 17/3053* (2013.01)

(58) Field of Classification Search
CPC .................................................. G06F 17/3053
See application file for complete search history.

(56) References Cited

U.S. PATENT DOCUMENTS

| 6,263,335 | B1* | 7/2001 | Paik et al. | |
|---|---|---|---|---|
| 7,181,447 | B2* | 2/2007 | Curtis et al. | |
| 7,707,142 | B1* | 4/2010 | Ionescu | 707/999.003 |
| 7,873,624 | B2* | 1/2011 | Agichtein et al. | 707/708 |
| 2003/0093276 | A1* | 5/2003 | Miller et al. | 704/257 |
| 2005/0050037 | A1* | 3/2005 | Frieder et al. | 707/3 |
| 2007/0022109 | A1 | 1/2007 | Imielinski et al. | |
| 2007/0073651 | A1* | 3/2007 | Imielinski | 707/3 |
| 2007/0076351 | A1* | 4/2007 | Kirner et al. | 361/600 |
| 2009/0287678 | A1* | 11/2009 | Brown et al. | 707/5 |

OTHER PUBLICATIONS

Brill, Eric et al., "Data-Intensive Question Answering," Microsoft Research, 2001, pp. 1-8, Redmond, Washingto, USA.

Cao, Yunbo et al., "Recommending Questions Using MDL-based Tree Cut Model," WWW 2008, Apr. 21-25, 2008, pp. 81-90, Beijing, China.

Garcia, Vanessa Lopez, et al., "AquaLog: An ontology-driven Question Answering System to interface the Semantic Web," Proceedings of the Human Language Technology Conference of the NAACL, Companion Volume, pp. 269-272, New York City, Jun. 2006.

(Continued)

*Primary Examiner* — Ajith Jacob
(74) *Attorney, Agent, or Firm* — Stephen M. De Klerk

(57) ABSTRACT

In a method for a direct answer for search, a search query is received over a network, one or more answer candidate snippets for the search query are received, with an answer candidate snippet having at least a portion of content available over the network for an answer candidate, one or more answer entities are determined within a selected answer candidate snippet, a frequency of the one or more answer entities found within the one or more answer candidate snippets for the search query is determined, a confidence score is adjusted for the selected answer candidate in accordance with the frequency of the one or more answer entities found within the one or more answer candidate snippets, and at least one answer candidate snippet is sent for a response to the search query.

16 Claims, 16 Drawing Sheets

(56) References Cited

OTHER PUBLICATIONS

Hickl, Andrew et al., "Question Answering with LCC's Chaucer-2 and TREC 2007," 2007, 10 pages, Language Computer Corporation, Richardson, Texas.

Maldovan, Dan et al., "Lymba's Power Answer 4 in TREC 2007," 2007, 9 pages, Lymba Corporation, Richardson, Texas.

Hovy, Eduard, et al., "Toward Semantics-Based Answer Pinpointing," 2001 HLT ISI/USC Webclopedia, Information Sciences Institute, University of Southern California, Marina del Rey, California.

Katz, Boris et all, "Integrating Web-based and Corpus-based Techniques for Question Answering," 2003 TREC MIT Start, MIT Computer Science and Artificial Intelligence Laboratory, Cambridge MA.

Kwok, Cody, et al., "Scaling Question Answering to the Web," , Nov. 13, 2000, pp. 1-22, 2001 WWW University of Washington, Seattle, WA.

Srihari, Rohini, et al., "A Question Answering System Supported by Information Extraction," 2000, pp. 166-172, ANLP-NAACL.

Schlaefer, Noco et al., "OpenEphyra open source QA system," www.openephyra.com, 2006 HLT.

\* cited by examiner

FIG. 11

| Snippet |
|---|
| title = Uncle Tom's Cabin<br><br>description = American History<br><br>url = www.africanaonline.com/slavery_toms_cabin_htm<br><br>content = In 1852, Harriet Beecher Stowe wrote "Uncle Tom's Cabin" to show slavery as a thing so cruel and unjust. ... When Harriet Beecher Stowe's antislavery novel Uncle Tom's Cabin was published, it was an immediate best-seller, and became the most sensational and best-selling book of the 19$^{th}$ century. French writer George ... |

FIG. 12

METHOD AND SYSTEM FOR DETERMINING CONFIDENCE IN ANSWER FOR SEARCH

BACKGROUND

An internet or web search engine is a tool designed to search for information on the World Wide Web. Search engine/system providers aim to have a high degree in accuracy in delivering desired search result desired by a user for a given set of search terms. Approaches for ensuring delivery of accurate and desired search results have largely relied on finding search terms within a web page and/or a history of delivering a particular web page to a user with the same search terms.

SUMMARY

Embodiments of a method, a system and a computer-readable medium for a direct answer for search are disclosed. In an embodiment, a search query is received over a network, one or more answer candidate snippets for the search query are received, with an answer candidate snippet having at least a portion of content available over the network for an answer candidate, one or more answer entities are determined within a selected answer candidate snippet, a frequency of the one or more answer entities found within the one or more answer candidate snippets for the search query is determined, a confidence score is adjusted for the selected answer candidate in accordance with the frequency of the one or more answer entities found within the one or more answer candidate snippets, and at least one answer candidate snippet is sent for a response to the search query.

BRIEF DESCRIPTION OF THE DRAWINGS

The invention is described by way of example(s) with reference to the accompanying drawings, wherein:

FIG. 11 depicts an exemplary Interface in accordance with an embodiment of an intelligent search system.

FIG. 12 depicts an exemplary Snippet in accordance with an embodiment of an intelligent search system.

DETAILED DESCRIPTION

Embodiments of the present invention are directed toward intelligent search systems, methods, and computer readable mediums. Intelligent search systems may attempt to provide more relevant search results in response to a search query. In one or more embodiments, the intelligent search system may provide a direct answer, such as a text statement with an answer, in response to an explicit or implicit question determined from a search query. As used herein, a search system, method, and/or a computer readable medium with instructions to provide an answer in response to a search query may be referred to as an implementation of "direct answer from search" (DAFS). The answer to a search query may be presented instead or in addition to search results. Search results may contain a content identifier for the answer. A content identifier is a reference or link to content that is relevant to may be relevant to the search query. The content identifier may be a Uniform Resource Locator (URL). For example, a search query that contains "When did Columbus discover America?" may return a text answer "Columbus discovered America in 1492." Similarly, the same question may be implied with a search query that contains terms "America, Columbus, discover, year" and the same answer of "Columbus discovered America in 1492" may be returned. The content identifier(s) that identified the answer may be presented with the answer.

One or more embodiments of the present invention are directed toward determining confidence in an answer that may be presented in response to a search query with an intelligent search system. Confidence may be a score or a percentage that indicates a level of certainty that an answer candidate is the answer desired with a given search query.

One or more embodiments of the present invention are directed toward determining a relevant content identifier to present in response to a search query for an intelligent search system.

Figure 1:
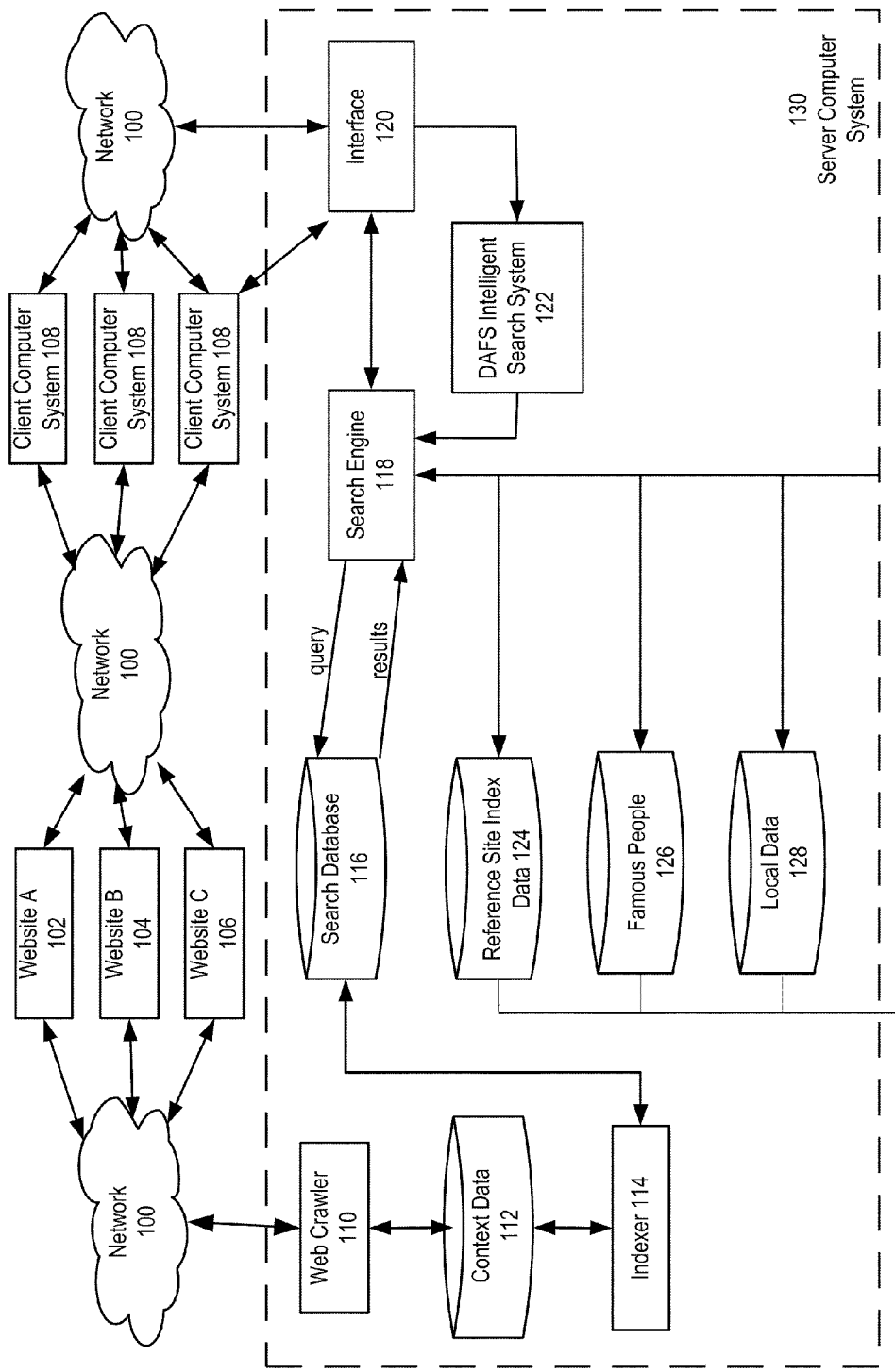
FIG. 1 depicts an exemplary system for implementing an intelligent search system.

FIG. 1 depicts an exemplary system for implementing an intelligent search. A network 100 is a group of two or more connected computer systems to enable the exchange of data. The network 100 may employ the use of any number of protocols, standards, or formats to enable communication between networked computer systems. An internet is a group of two or more connected computer networks or portions of networks that enable communication between computer systems on accessible networks. As such, a computer system that is available to communicate with another computer system over a network may communicate over a local area network (LAN), a wide area network (WAN), world wide web, extranet, intranet, internet, or any other type of network, and the term "network" may be used interchangeably throughout. The network 100 may allow for communication between the elements of FIG. 1 including, but not limited to, Website A 102, Website B 104, Website C 106, Client Computer System 108, Web Crawler 110, Context Data 112, Indexer 114, Search Database 116, Reference Site Index Data 124, Famous People 126, Local Data 128, Search Engine 118, Interface 120, Intelligent Search System 122, and Server Computer System 130.

As depicted in FIG. 1, Website A 102 may have data or content available over the network. Data and content available over the network may be in the form of text, hypertext markup language (HTML) pages, extensible markup language (XML), pages generated by scripts or application servers, and any other type of data available over the network. A website may have one or more web pages and the web pages may have a common root URL. Web page is used broadly throughout to include a static markup language file (e.g. HTML page), a generated page, a portion of a web page, or any portion of a page or data that is available over a network. Although a web server is not depicted, a client may request that a web server provide access to Website A 102, and the web server may provide access to the data that allows for presentation of a webpage of Website A 102. For example, a webpage of Website A 102 may be data, such as a HTML page, that may transmitted to a client at a Client Computer System 108 in response to a request, such as an Hypertext Transfer Protocol (HTTP) request, received at a web server.

A Crawler 110 is a software program or script that locates and retrieves content available on the network. The Crawler 110 may follow links to websites and webpages available on the network to ensure that content for one or more websites is captured. Website A 102, Website B 104, and Website C 106 may be crawled by a Crawler 110. The Crawler 110 may be configured to indiscriminately crawl the web or may be given priorities for collecting content available on the network. The Crawler 110 may collect a copy of the content, changes to content since the data was last captured, information on content available, and/or check to ensure the website is operational. Optionally, a copy of content collected by the Crawler 110 may be stored in a Collected Data Store 112. The Collected Data Store 112 may be any type of database. A database is any collection of data that may be stored and queried for retrieval of the stored data.

After data has been collected, an Indexer 114 may index or categorize the data. The Indexer 114 may be software or a script that indexes and/or categorizes the data collected by the Crawler 110. The indexed data optionally may be stored in a Search Database 116. A Search Engine 118 may query a Search Database 116 to retrieve indexed data upon request.

A Client Computer System 108 may have client software, such as a web browser, that may send a request through an Interface 120 to Intelligent Search System 122 and/or the Search Engine 118. The Intelligence Search System 122 and Search Engine 118 are depicted as being part of a Server Computer System 130 and the Server Computer System 130 receives requests from a client over the network or with a direct connection to the Server Computer System 130. Although depicted as a Client-Server model, those skilled in the art will recognize that other models are available for implementation of an intelligent search system. In one or more embodiments, the Intelligent Search System 122 may send queries through the Search Engine 118 to the Search Database 116. Optionally, the Search Engine 118 may query Reference Site Indexed Data 124, Famous People Data 126, Local Data 128 or any other collected data. The Reference Site Indexed Data 124, Famous People Data 126, and Local Data 128 may be fed to the system by a third-party or similarly collected by the Crawler 110.

The Client Computer System 108 may receive a response from the Search Engine 118 and/or Intelligent Search System 122. As discussed above, the Intelligent Search System 122 may respond with a text answer to a search query in addition to search results. The Intelligent Search System 122 may transmit data for display of a webpage on the Client Computer System 108 with the search results and the text answer.

Although the elements of the search system are depicted as being part of one server, those skilled in the art will recognize that the elements of the search system may be on multiple computer systems.

Figure 2:
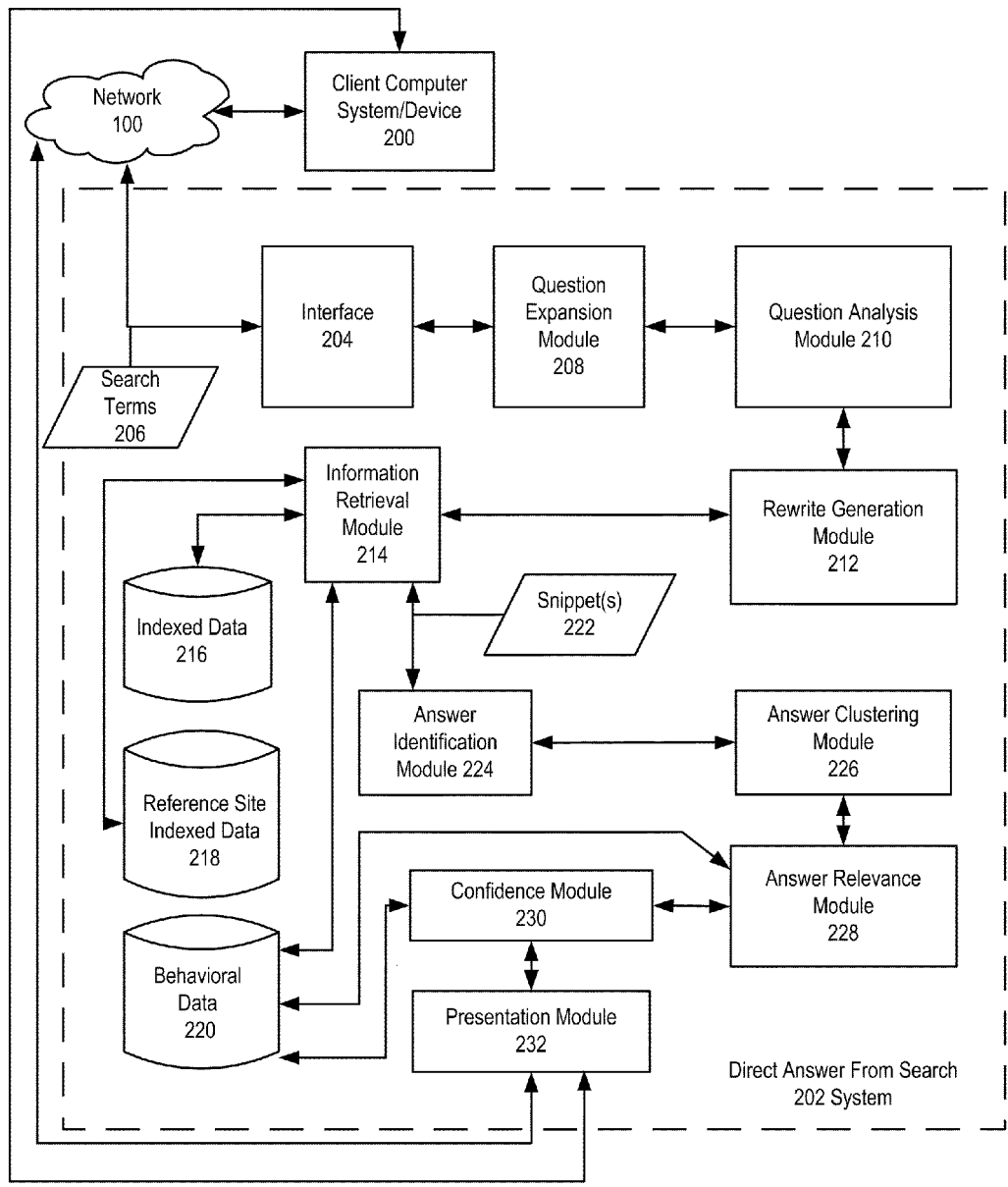
FIG. 2 depicts an exemplary system for implementing an intelligent search system.

FIG. 2 depicts an exemplary system for implementing an intelligent search system. A Client Computer System 200 interacts with a DAFS System 202, an intelligent search system, over the Network 100. As will be appreciated by those skilled in the art, the functional elements of the DAFS System 202 as illustrated in FIG. 2 are provided as an example, and various implementations of the system may have subsets of the functional elements and/or elements may be distributed among various computer systems (as indicated by the dashed line). In an embodiment, the DAFS System 202 may be a server with instructions executing on a computer system and servicing requests received from a client executing on the Client Computer System 200 over a Network 100. In another embodiment, the DAFS System 202 may be stored and executed as a stand-alone application on a computer system.

A Client Computer System 200 may interact with the DAFS System 202 using an Interface 204. The Interface 204 may be a webpage, an application programming interface (API) or any other type of interface that allows for communicating a request to the DAFS System 202. Embodiments may view the Interface 204 as a front end for the DAFS System 202 and the back end may consist of the elements of the DAFS System 202 that handle responding to the search query. In one or more embodiments, the DAFS system 202 may be a web service which provides an API that can be accessed locally and over a network, such as the internet, and allows for execution of instructions on a remote system hosting the requested service. The Client Computer System 200 uses the Interface 204 to request a search query and input Search Terms 206 for the search query. For example, the Client Computer System 200 may use a client, such as a browser, to request the web page Interface 204 for the DAFS System 202 and input a request for a search query with Search Terms 206 and submit the request to the DAFS System 202. Embodiments may provide a web page interface with a form text input box that allows for the input of text search terms. Other embodiments may restrict search terms permitted to be inputted, such as with radio buttons or display of any other limitation on the selection of search terms.

As indicated above, the Search Terms 206 may explicitly or implicitly indicate a question and the DAFS System 202 may provide an answer for the question indicated by the Search Terms 206. The Question Expansion Module 208 may compare Search Terms 206 in a search query to a question pattern in order to determine the type of question that the query may represent. In one or more embodiments, a question pattern may have one or more question templates or grammars that enable identification of a type of question indicated by the Search Terms 206. In a preferred embodiment, a pattern (e.g. question pattern, answer pattern) is a regular expression that can be used to match a question in Search Terms or an answer within text. For example, the Question Expansion Module 208 may parse the search query by tokenizing (e.g. identifying specific words in the Search Terms) the Search Terms 206 and using a grammar to identify a question or set of questions that the Search Terms 206 represent. By way of further example, each a question pattern may represent one or more questions, such as "when was x born" or "what is the birthdate of x" and the question pattern would allow for the identification of the similar questions. Questions that may be categorized together for question patterns may be determined manually and/or dynamically determined from prior interactions with the DAFS System 202. A tokenizer or lexer may identify tokens "when, was, born" and recognize "Madonna" as a name token, and a grammar may be used to identify a particular order of the Search Terms 206 that indicate a question, such as "when was x born." In some embodiments, a comparison between the tokens identified and a set of tokens identified with a question pattern may indicate the question posed by the Search Terms 206.

Optionally, the Question Analysis Module 210 may identify a type or classification of answer that is expected from a question. The classification of the answer expected may be determined from a question pattern itself. For example, interrogative words within a question pattern and/or Search Terms may be used to classify an answer for the Search Terms 206 (e.g. "Who" may indicate a person is expected as an answer, "When" may indicate a date is expected as an answer, "Where" may indicate that a location is expected as an answer). Similarly, adjectives may indicate an answer. By way of example, the adjectives after "how" may be used to classify the category of the numeric value (e.g. "much" may indicate a price or other amount is expected as an answer, "tall" and "high" may indicate a height is expected as answer, "large" and "big" may indicate a size is expected as answer). The nouns in a search query may indicate an answer (e.g. "time" after the word "what" may indicate a time is expected as an answer). Occupational words may be used to identify the type of answer expected (e.g. "president" may indicate a president is expected as an answer). Statistics may also be used to determine the answer expected from a set of Search Terms 206. A generic machine learning system, such as dbacl, may be used to determine the answer expected from a set of Search Terms 206. Those skilled in the art will recognize that there may be a variety of ways to identify an answer expected from a set of Search Terms 206.

The Rewrite Generation Module 212 may be used to generate a variety of queries for Search Terms 206 inputted with the original search query. Embodiments may rely on question patterns to determine similar queries for a set of Search Terms 206. For example, continuing with the above example, Search Terms of "When was Madonna born" may allow for the generation of a query with Search Terms of "What is the birth date of Madonna."

One or more queries may then be submitted by the Information Retrieval Module 214. Queries may be submitted to one or more databases or data stores to retrieve query results. The query results may indicate answer information for the one or more queries determined by the Rewrite Generation Module 212. For example, one or more queries may be sent to databases for Indexed Data 216, Reference Site Indexed Data 218, and Behavioral Data 220. Indexed Data 216 may be data that has been retrieved by crawling the internet and/or provided by a third party and categorized for information retrieval. In one or more embodiments, reference site data that is indexed, illustrated with Reference Site Indexed Data 218, may be queried. Examples of reference data that may be indexed and search are Wikipedia® and Merriam-Webster Online Dictionary copyright©. Behavioral Data 220 may also be information on behavior or use of the system by users. The behavioral data may include, but is not limited to, interactions by a user within a session with the system, interactions by multiple users with the system, interactions with the system that indicate popularity of queries, answers, links, and data, and user click popularity for URLs. An example of behavioral data is provided in U.S. Pat. No. 7,181,447, entitled "Methods and Systems for Conceptually Organizing and Presenting Information," filed May 24, 2004, hereby incorporated by reference.

Snippets 222 may be determined from the query results returned to the Information Module 214. Snippets 222 may be any information about data or content available over the network. A snippet may include a portion of a piece of content available over the network. For example, a Snippet 222 may include, but is not limited to, a title for a web page, a description of the web page, a content identifier (e.g. a URL) to locate the web page, and content available on the web page. An Answer Identification Module 224 may be used to identify the answer within one or more Snippet(s) 222. An answer pattern may be used to identify the answer within a snippet. The answer pattern may include, but is not limited to, a lexer, a parser, a grammar, a script, or any combination thereof.

An Answer Clustering Module 226 may cluster the Snippet(s) 222 into groups of Snippet(s) 222 that may identify similar or nearly the same answer. A cluster of Snippet(s) 222 may be viewed as a set of Snippet(s) 222 for an answer candidate and the set or a portion of the set of Snippet(s) 222 may be presented with the answer candidate in response to the originally submitted search query. An answer candidate is a potential answer for the originally search submitted query. The answer candidates may be ranked and one or more answers may be selected from the answer candidates for presentation in response to the originally submitted search query.

An Answer Relevance Module 228 may be used to determine the best URL within the answer candidates. A Confidence Module 230 may be used to determine the confidence in the answers to be presented to the user. The Confidence Module 230 may rank and/or rerank the answer candidates for presentation. A Presentation Module 232 allows for presentation of the answer(s) returned by the DAFS System 202. The Presentation Module 232 may generated and/or enable the transmission of data that allows for presentation of a web page on a client executing on the Client Computer System 200. The Presentation Module 232 may enable a thin client, a thick client, and/or a stand-alone application to execute on a Client Computer System 200. In one or more embodiments, the Presentation Module 232 may allow streaming of data for presentation of the answers to the client, such that all data for presentation of the answer to the user does not have to be downloaded to the Client Computer System 200 to enable display of answers.

Figure 3A:
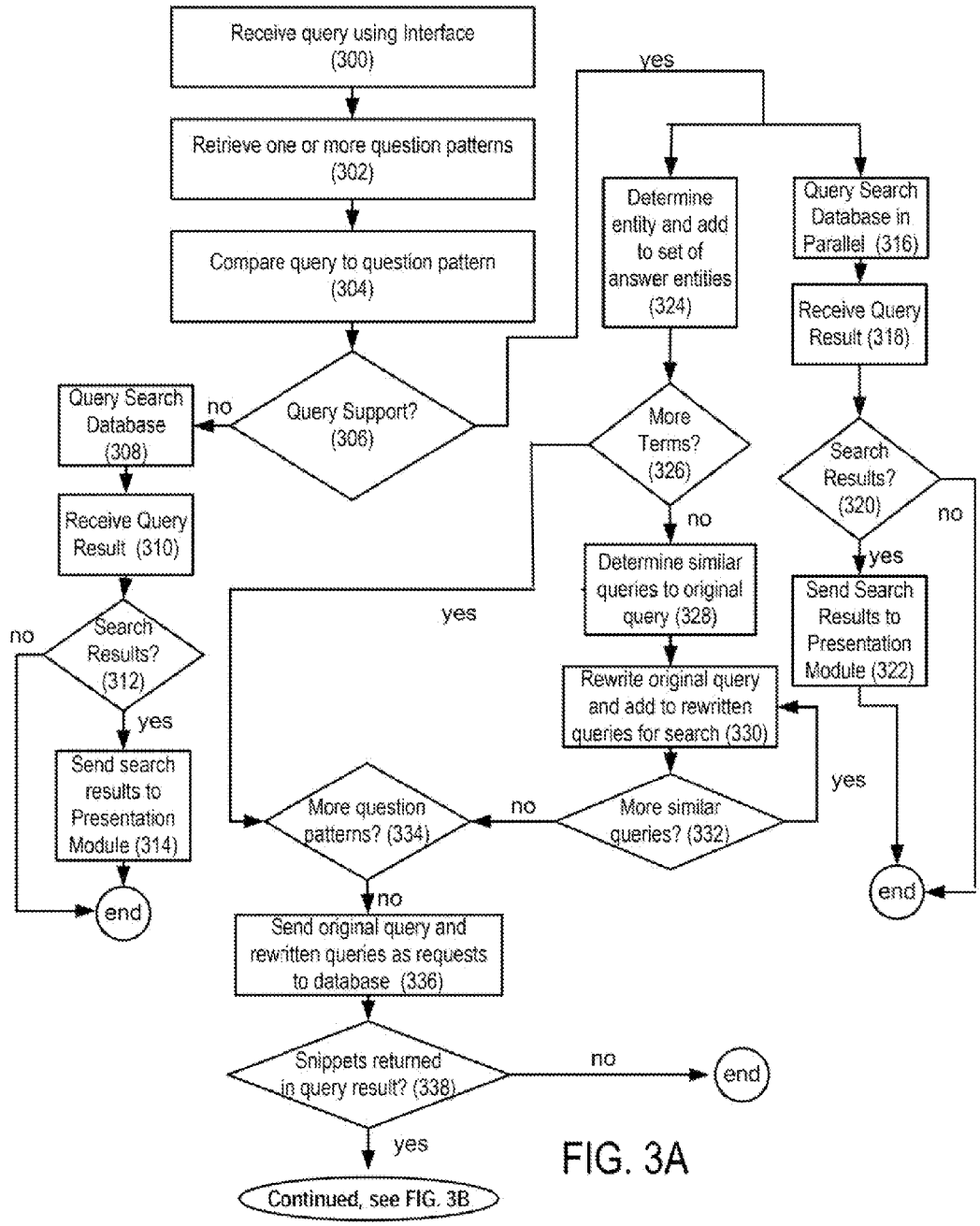
FIG. 3 depicts an exemplary flowchart for an implementation of an intelligent search system.

FIG. 3 depicts an exemplary flowchart for an implementation of an intelligent search system. Initially, a query may be received by a DAFS system 202 using an interface (300). The query may be a set of Search Terms 206 that is submitted in a request from a Client Computer System 200 to the DAFS system 202. For example, a client, such as a browser, may be executing on the Client Computer System 200 and allow for sending an HTTP request using a web page interface. For clarity's sake, the query submitted initially to begin a search may be referred to as the "original search query" throughout.

Next, one or more question patterns may be retrieved using the Search Terms 206 (302). The one or more question patterns may then be compared to the original search query (304). The Search Terms 206 may serve as a guide for which question patterns may be retrieved. For example, Search Terms 206 of "Madonna, birth, of" may indicate that a question pattern should be retrieved with questions: "when is x's birthday," "what is the birthdate of x," and "when was x born."Continuing with the example, the Search Terms 206 "birth of Madonna" may also indicate that a question pattern with questions: "when did x give birth," and "when was x's child born."

A determination is made whether the original search query is supported by the DAFS System 202 (306). The comparison of the original search query to the retrieved question patterns may indicate if the original search query may be supported by the DAFS System 202. If the DAFS System 202 does not support providing an answer for the original search query, then a Search Database 116 may be queried (308).

By way of example, querying a Search Database 116 may include a search with the original search query against an indexed data may be performed with the search terms in the original search query. Although depicted as a Search Database 116, those skilled in the art will recognize that any number of queries and databases may be used to return search results for the original search query (310). Next, a determination is made as to whether search results were returned by searching with the original search query (312). If search results were not returned from querying the Search Database 116, then the search ends. Optionally, the Presentation Module 232 may indicate that the search was unsuccessful. Alternatively, the search results may be sent to the Presentation Module 232 for presentation on the Client Computer System 200 (314).

Continuing with FIG. 3, if the DAFS System 202 does support the original search query (306), then the Search Database may optionally be queried in parallel with performance of the DAFS intelligent search (316). As described in detail above, the Search Database may be queried with the original search query (316). Depending on whether the query result (318) contains search results (320), the search results may be presented with the Presentation Module (322). If search results are not returned, the query search of the Search Database 116 may end. Those skilled in the art will recognize that the search with the DAFS System 202 may still be executing even though the query of the Search Database 116 executing in parallel has ended. Although depicted as two processes that execute in parallel, those skilled in the art will recognize that the searches may be performed in any order preferred.

Continuing with FIG. 3, an entity may be determined from a Search Term 206 (324) and the entity may be added to a set of answer entities determined from Search Terms 206 (324). An entity may be a key term, topic, category, or keyword. Next, a determination is made as to whether there are more Search Terms 206 (326), and if there are more search terms, then entities are determined from the Search Terms 206 (324) until there are no more Search Terms 206 and/or enough entities have been determined for the DAFS System 202.

Alternatively, when a search for entities has been performed for the Search Terms 206 (326), a determination is made as to whether there are similar or nearly similar queries for the original search query (328). The question patterns may indicate queries that are similar to the original search query. The original search query may be rewritten and added to a set of rewritten queries for the DAFS search (330). For example, an original search query with Search Terms 206 "Madonna, birth, of" may allow for rewrites of the original search query of "when is Madonna's birthday," "when was Madonna born," and "what is Madonna's birth date." If there are more similar queries for a query as indicated by a query pattern (332), then the original search query may be rewritten and added to a set of rewritten queries (330). If all similar queries for a query pattern (332) have been added to the set of rewritten queries, then a determination is made as to whether there are more question patterns (334). If there are more question patterns, then similar queries are determined for the original search query (328), the original search query is rewritten (330) for each similar query (332) which may be determined by the query pattern.

Alternatively, if there are no more query patterns (334), then the original search query and the set of rewritten queries are sent as query requests to the database (336). The original search query and set of rewritten queries may be sent as a query request to a database by the Information Retrieval Module 214. If the Information Retrieval Module does not return query results (338), then the DAFS search may end. The query results may be returned in the form of one or more Snippets 222. Optionally, the Presentation Module 232 may indicate that no DAFS search results were found. Alternatively, if Snippet(s) 222 were returned by the Information Retrieval Module 214 (338), then the DAFS search may continue with FIG. 3B.

Figure 3B:
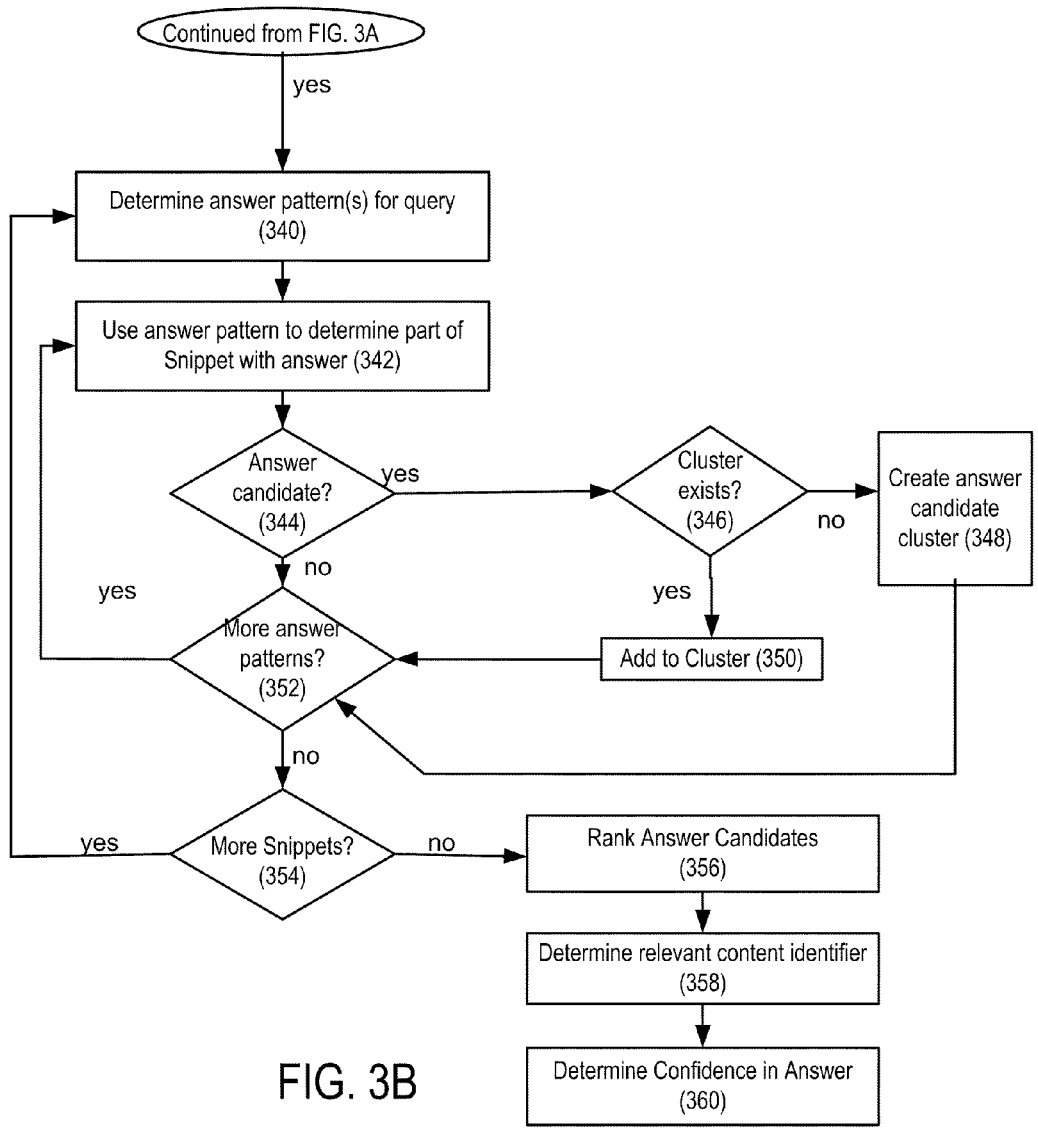

Continuing to FIG. 3B, answer patterns may be determined (340) to extract the answer from a Snippet 222 (342). In one or more embodiments, the query used to query the database for query results by the Information Retrieval Module 214 may be used to determine the answer patterns that can be used to locate an answer within the text included or accessible with a Snippet 222. Embodiments may use a set of words to serve as an answer pattern and a search within the text of accessible with a given Snippet 222 may be performed to find the set of words within the text. For example, for a query that contains terms "when was x born", the answer pattern may be "[x] was born on [Month] [day] [comma] [year]" (where x is a name, month is a month, day is a day possible within the month, comma is a "," and year is a possible year). The answer pattern may be used to directly match a sentence within the text accessible with a Snippet 222 by parsing the text accessible with the Snippet 222. Text that is accessible with the Snippet 222 may be included within the Snippet 222, accessible by retrieving data with a content identifier for the Snippet 222 or any combination thereof. In one or more embodiments, the answer pattern may be used as a guide and the sentence fragment provided with the answer pattern may not need to be matched exactly. Next, a determination is made as to whether an answer candidate can be obtained with a Snippet 222 and answer pattern (344). An answer candidate is a potential answer for the original search query. If an answer candidate (344) cannot be determined from the Snippet 222 with the answer pattern (344), then a determination is made as to whether another answer pattern is available (352) and the process to find an answer within the Snippet 222 is repeated. If an answer candidate is determined from a Snippet 222 (344), then the Snippet may optionally be clustered or grouped with Snippet(s) 222 that had the same answer. To cluster the Snippet 222 with the answer candidate, a search is performed for the existence of the cluster or group with a similar answer (346). If a cluster does not exist (346), then an answer candidate cluster (348) is created with the Snippet 222 added to the new cluster, and a determination is made as to whether there are more answer patterns (352). Alternatively, the Snippet 222 may be added to the cluster for the answer candidate (350), and a determination is made as to whether there are more answer patterns (352). If there are more answer patterns, then the process is repeated until all answer patterns are exhausted. In other embodiments, the process for determining an answer from a Snippet 222 may end after an answer is found in a Snippet 222.

Alternatively, if there are no more answer patterns (352), then a determination is made as to whether there are more Snippet(s) 222 (354). The process for finding an answer with answer patterns is then repeated for the next Snippet 222 (340). If the Snippets 222 needed for determining an answer have all been processed, then the answer candidates are ranked (356). As previously described, the Snippet(s) 222 that produces the same or nearly the same answer may have been clustered. Next, a determination is made as to the relevant content identifier for the answer candidates (358) and a determination is made as to the confidence in the answer (360) to be presented to the user.

Figure 4:
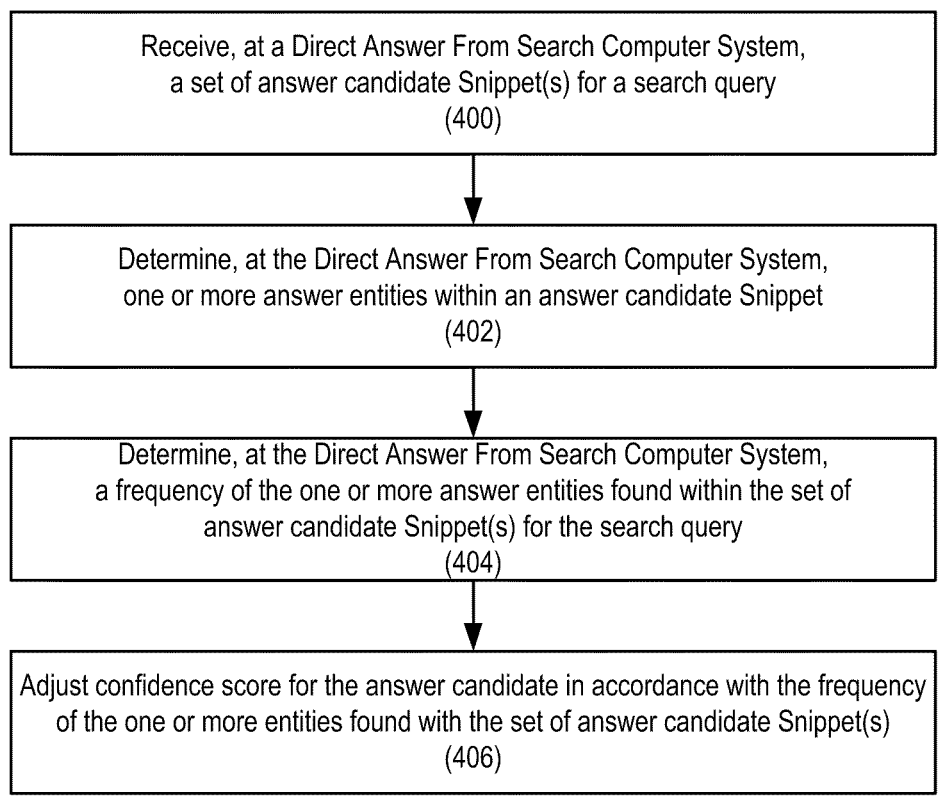
FIG. 4 depicts an exemplary flowchart for an implementation of determining confidence in an answer.

FIG. 4 depicts an exemplary flowchart for an implementation of determining confidence in an answer. As indicated above, confidence in an answer may be represented with a score and/or a percentage that indicates a level of certainty that an answer candidate is the answer desired with a search query. The confidence for an answer candidate may indicate that the answer candidate should be presented in response to a search query. Confidence may be determined by comparing answer candidates to other answer candidates. Confidence may also be determined for a Snippet for an answer candidate as compared to other Snippets identified with a search query. Those skilled in the art will recognize that the level of granularity for confidence is an implementation detail. For example, confidence can be determined for an answer candidate using all Snippet(s) 222 for the answer candidate (e.g. all Snippets included in the cluster for the answer candidate) and/or a particular Snippet 222 (e.g. a representative Snippet for the cluster) for an answer candidate within a cluster. Similarly, confidence for an answer candidate may be determined for a particular Snippet 222 as compared to other Snippets within the cluster and/or confidence for an answer candidate may be determined for a particular Snippet 222 as compared with all Snippet(s) identified with a search query.

Initially, a DAFS Computer System 202 may receive a set of answer candidate Snippet(s) for a search query (400). As indicated above, a Snippet 222 may be any information about data or content available over the network. For example, a Snippet 222 may include, but is not limited to, a title for a web page, a description of the web page, a content identifier (e.g. a URL) to locate the web page, and content available on the web page. The content available on the web page may be a sentence, phrase, and/or entity (e.g. keyword) provided on the web page. The set of answer candidate Snippet(s) 222 may be a cluster of Snippet(s) 222 identified for a particular answer candidate. The set of answer candidate Snippet(s) 222 for a search query may include Snippet(s) 222 returned with the original search query as well as rewritten queries. In other embodiments, the set of answer candidate Snippet(s) 222 may include a cluster for determined for a single query.

The Confidence Module 230 may receive the set of answer candidate Snippets 222 from any module within the DAFS system 228. Confidence may be performed after clustering and/or directly after identification of Snippets 222 from the Information Retrieval Module 214. Confidence determination may be a process that is executed in parallel with other processes within the DAFS system 202.

Continuing with FIG. 4, one or more answer entities within an answer candidate Snippet 222 are determined (402). An answer entity is a keyword and/or phrase that may be found within the Snippet 222. FIG. 12 provides an example of a Snippet in accordance with an implementation of a DAFS System. Answer entities in FIG. 12 may be "Uncle Tom's Cabin" from the title, "American History" from the description, "slavery" and "slavery_toms_cabin" from the URL, "1852" and "Harriet Beecher Stowe," "wrote," and "Uncle Tom's Cabin" from the content, etc. The answer entity may be an original Search Term 206, a topic, a category, a word, or phrase that is within the answer candidate Snippet 222. For example, in FIG. 12, the Search Terms 206 "who wrote Uncle Tom's Cabin" may be found in the content, title, and URL of the Snippet of FIG. 12. The answer candidate Snippet 222 may be a Snippet 222 from the cluster of Snippets (e.g. a Snippet that represents the cluster). Alternatively, the answer entities may be determined for one or more Snippets for a cluster depending on the granularity desired for determining the confidence for an answer. For the remainder of the description of confidence, one answer candidate Snippet 222 will be described for confidence although those skilled in the art could use any number of Snippets 222 to determine the one or more answer entities for Snippets 222.

Next, a frequency of the determined one or more answer entities found within the set of answer candidate Snippet(s) for the search query is determined (404). Continuing with the example of FIG. 12, a frequency that answer entities (e.g. "Uncle Tom's Cabin," "1852," "Harriet Beecher Stowe," etc.) in a set of answer candidate Snippets for a search query may be determined.

A confidence score for the answer candidate in accordance with the frequency of the one or more entities found with the set of answer candidate Snippets may be adjusted (406). For example, the Snippet of FIG. 12 may be in a cluster for answer candidate "Harriet Beecher Stowe." The answer entities in the Snippet of FIG. 12 may have been present in 80% of a set of answer candidate Snippet(s). The score for answer candidate "Harriet Beecher Stowe" can be adjusted accordingly such that the answer candidate may be presented as an answer.

Figure 5:
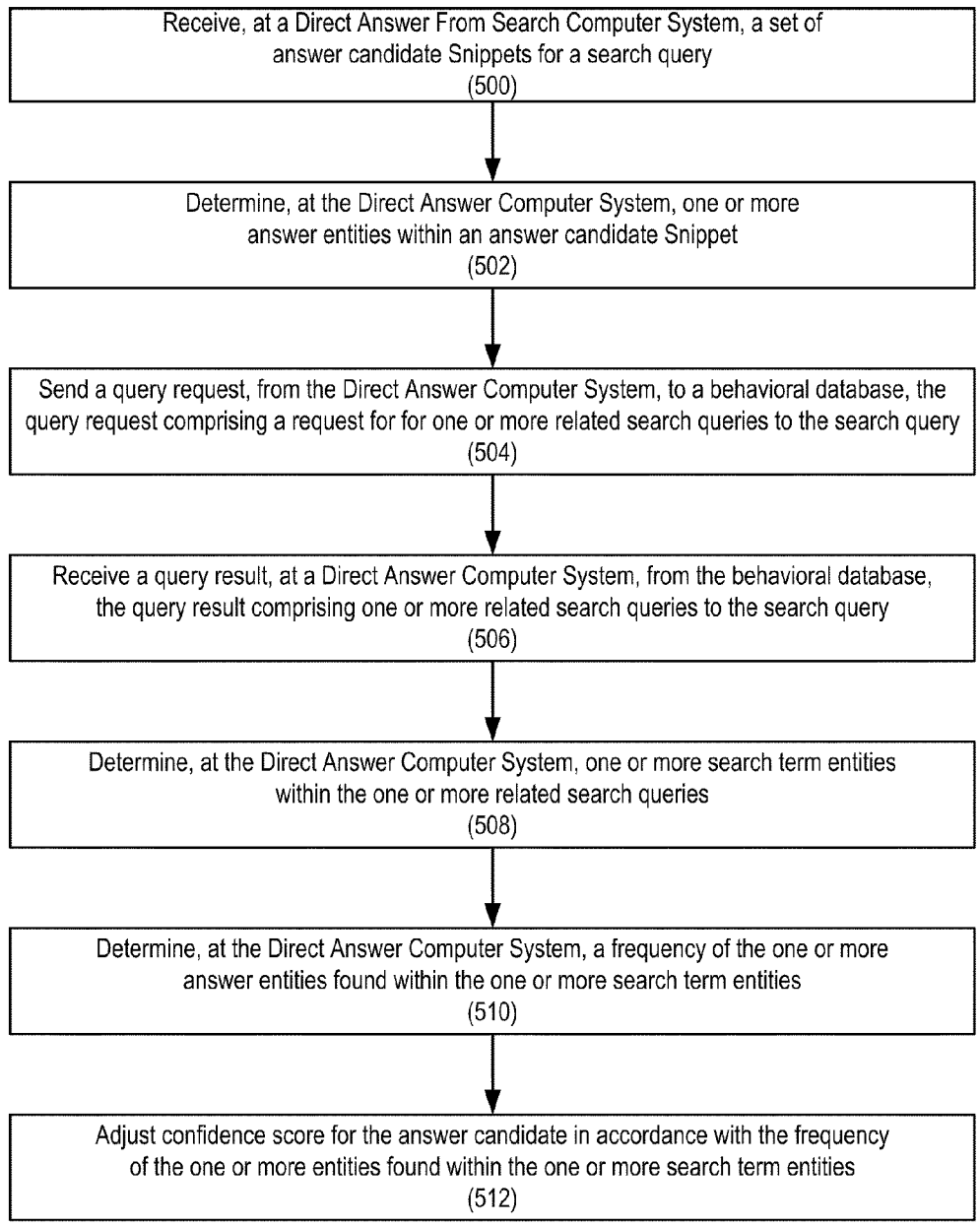
FIG. 5 depicts an exemplary flowchart for an implementation of determining confidence in an answer.

FIG. 5 depicts an exemplary flowchart for an implementation of determining confidence in an answer. Initially, a set of answer candidate Snippet(s) 222 are received for a search query (500). As indicated above, the set of answer candidate Snippet(s) may be a cluster for an answer candidate and the search query may include the original search query and a set of rewritten search queries. Next, one or more answer entities are determined with an answer candidate Snippet (502).

A query request may be sent to a behavioral database (504). The behavioral database may have interactions with the system by users or by users with a search system. The query request to the behavioral database may be for one or more related search queries to the search query. In a preferred embodiment, the behavioral database may group queries that return a URL in search results and the URL is selected by users for the group of queries. For example, if a first query "who wrote Uncle Tom's Cabin" and a second query "Uncle Tom's author" both contain a search result with the URL from FIG. 12, and users of a search system selected the URL from FIG. 12 with both the first and second query, then the two queries may be grouped for the URL. In one or more embodiments, the first and second queries may be stored in a table of a database for the URL. Those skilled in the art will recognize that related queries may be determined by other methods. Related queries may be determined by a first query and a second query being submitted by a user within a session and/or by multiple users and/or multiple sessions.

Next, a query result may be received from the behavioral database (506). The query result may have one or more related queries for the search query. One or more search term entities may be determined from the query result with the one or more related search queries (508). Continuing with the same example, the search term entities "wrote," "Uncle Tom's Cabin," "Uncle Tom's," and "author" may be determined from the two queries. The search term entities may be entities (e.g. keywords) found within the two queries.

Next, a frequency of the one or more answer entities found within the one or more related search queries may be determined (510). The entities found within an answer candidate Snippet may be compared to the entities found within the related search queries (e.g. search term entities).

Next, the confidence score may be adjusted in accordance with the frequency of the one or more answer entities found with the one or more search term entities (512). For example, the confidence score may have an initial score of $35/100$ and with a frequency support of 20%, the confidence score may be increased. In one or more embodiments, the confidence score may increase for each occurrence of an answer entity for an answer candidate that is similar to a search term entity.

Figure 6A:
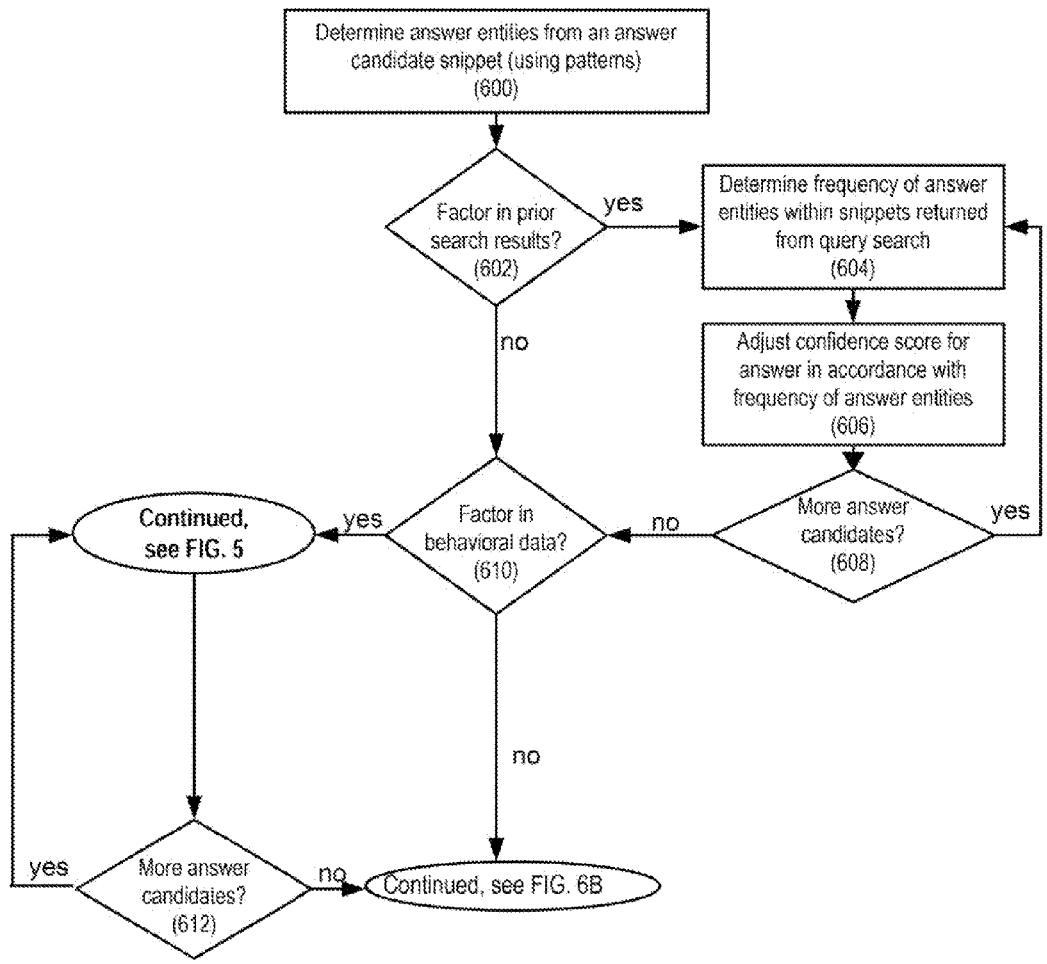
FIG. 6A depicts an exemplary flowchart for an implementation of determining confidence in an answer.
Figure 6B:
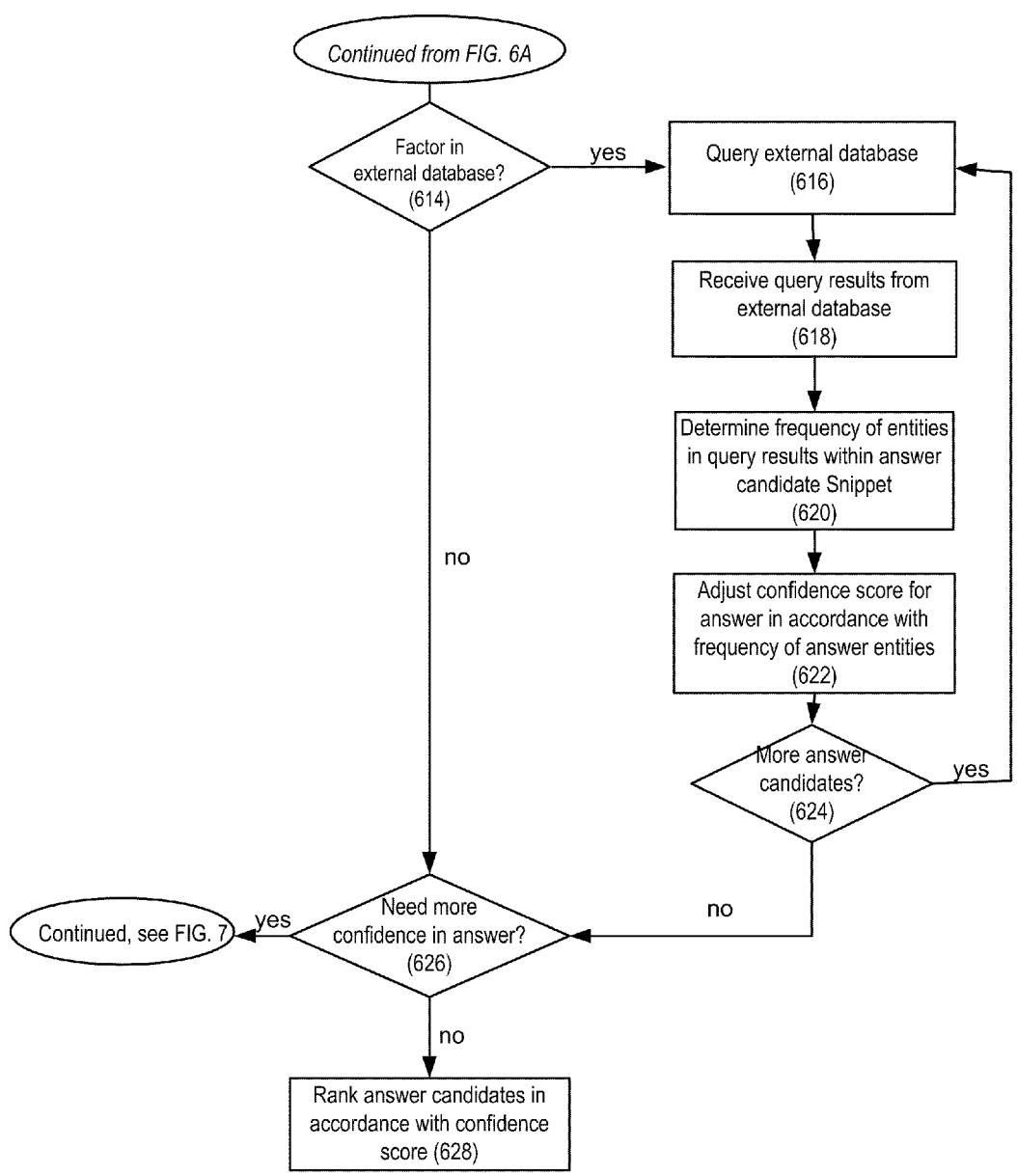
FIG. 6B depicts an exemplary flowchart for an implementation of determining confidence in an answer.

FIG. 6A depicts an exemplary flowchart for an implementation of determining confidence in an answer. Initially, answer entities from an answer candidate Snippet 222 are determined (600). The answer entities may be determined from an answer candidate Snippet 222 using an answer pattern. As indicated above, any number of Snippet(s) 222 may be selected to represent the answer candidate. For simplicities sake, one answer candidate Snippet 222 will be described in regards to FIGS. 6A-B.

Next, a determination is made as to whether to factor in prior search results (602). If prior search results are to be factored in to a confidence score (602), then the frequency of answer entities within all Snippet(s) 222 returned from a search query may be determined (604). The Snippet(s) 222 may include, but are not limited to, Snippet(s) 222 from the original search query and Snippet(s) 222 from query rewrites of the original search query. The confidence score for the answer candidate may be adjusted in accordance with the frequency of answer entities (606). In one or more embodiments, the confidence score may increase for each occurrence of an answer entity for an answer candidate in a Snippet 222 returned from the search query. Next, a determination is made as to whether there are more answer candidates (608). If there are more answer candidates (608), then the process for determining a confidence score for an answer candidate by factoring in prior search results will repeat (604).

Alternatively, if there are no more answer candidates (608), then a determination is made as to whether to factor in behavioral data (610). If behavioral data is to be factored in to the confidence score for the answer candidate (610), then the process described in FIG. 5 may be performed. Next, a determination is made as to whether there are more answer candidates (612). If there are more answer candidates (612), then the process for determining a confidence score for an answer candidate by factoring in behavioral data may repeat by continuing with FIG. 5.

Alternatively if behavioral data is not to be factored in to the confidence score (610) and/or there are no more answer candidates for factoring in behavioral data (612), then a determination is made as to whether to factor in an external database (614). If a determination is made to factor in an external database (614), then the external database may be queried (616), continued on FIG. 6B. The external database may receive a query with the original search query. The external database may be a third-party that is a reference site, such as Wikipedia® and Merriam-Webster Online Dictionary copyright©. The data may be from an external database but reference site data may be indexed and the indexed reference site data may be used for querying to get terms (e.g. entities) returned with the original search query.

Next, the query results from querying the external database are received (618). The entities within the external database query results may then be compared to the answer candidate answer entities (620). The confidence score may be adjusted for the answer candidate in accordance with the frequency of answer entities found within the query results from the external database (622). If there are more answer candidates (624), then the process for determining a confidence score for an answer candidate by factoring in an external database may repeat (614).

Alternatively if an external database data is not to be factored in to the confidence score (614) and/or there are no more answer candidates for factoring in behavioral data (624), then a determination is made as to whether more confidence is needed in an answer (626). If more confidence in the answer is unnecessary (626), then the answer candidates are ranked in accordance with their confidence score (628). One or more answers for the answer candidates may be provided to the Presentation Module 232 for presentation on a Client Computer System 200. Alternatively, if more confidence in the answer is desired (626), then further processing of confidence continues with FIG. 7.

Figure 7:
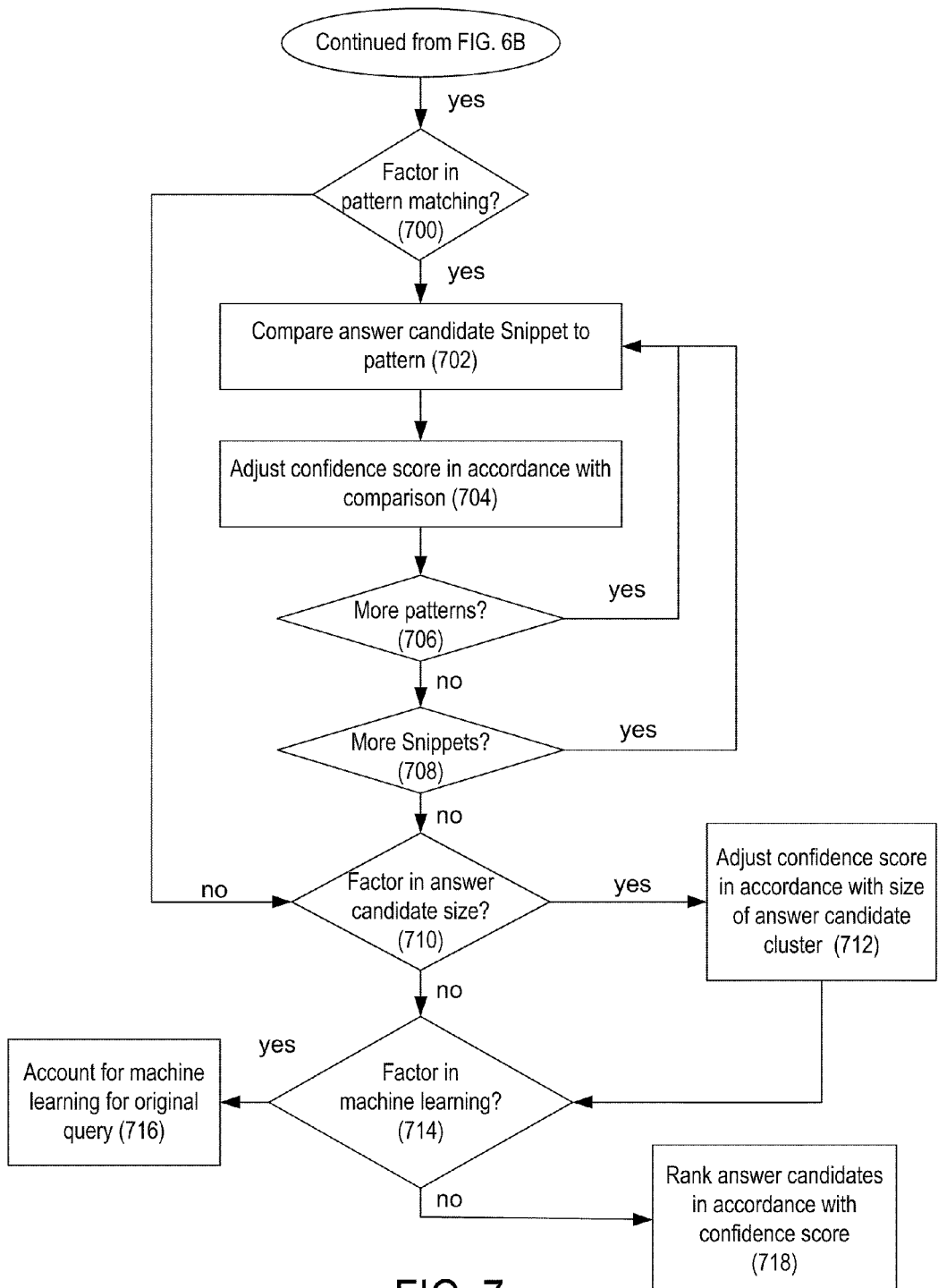
FIG. 7 depicts an exemplary flowchart for an implementation of determining confidence in an answer.

FIG. 7 depicts an exemplary flowchart for an implementation of determining confidence in an answer. A determination is made as to whether to factor in pattern matching (700). If pattern matching is factored in to the confidence (700), then a comparison between an answer candidate Snippet 222 to a pattern is performed (702). The pattern may be an answer pattern and the comparison may indicate how close the answer candidate Snippet 222 is to the answer pattern. The confidence score for the answer candidate may be adjusted in accordance with the comparison (704). If there are more patterns for comparison (706), then the process for comparison to a pattern repeats (702). Alternatively, if there are no more patterns for comparison (706) and there are more Snippet(s) 222 (708), then the process may repeat with more answer candidate Snippet(s) 222 (702). If there are no more Snippet(s) (708), then a determination is made as to whether to factor in answer candidate size (710). If answer candidate size is factored in to the confidence for an answer candidate (710), then the confidence score is adjusted in accordance with the size of the cluster (712).

Alternatively, if the answer candidate size is not factored (710) or the confidence score has already been adjusted for size (712), then a determination is made as to whether to factor in machine learning (714). If machine learning is to be factored in to the confidence (714), then machine learning may be accounted for in the confidence score for an answer candidate (716). Machine learning may be performed to track a user's interactions with the system and prior recorded behavior by one or more users with the original search query may influence the confidence in the answer candidate confidence score.

Next, the answer candidates are ranked in accordance with their confidence score (718). One or more answers for the answer candidates may be provided to the Presentation Module 232 for presentation on a Client Computer System 200.

In one or more embodiments, the age and/or date of the URL associated with the answer candidate Snippet 222 may factor in to the answer candidate Snippet 222 presented with the Presentation Module 232.

Figure 8:
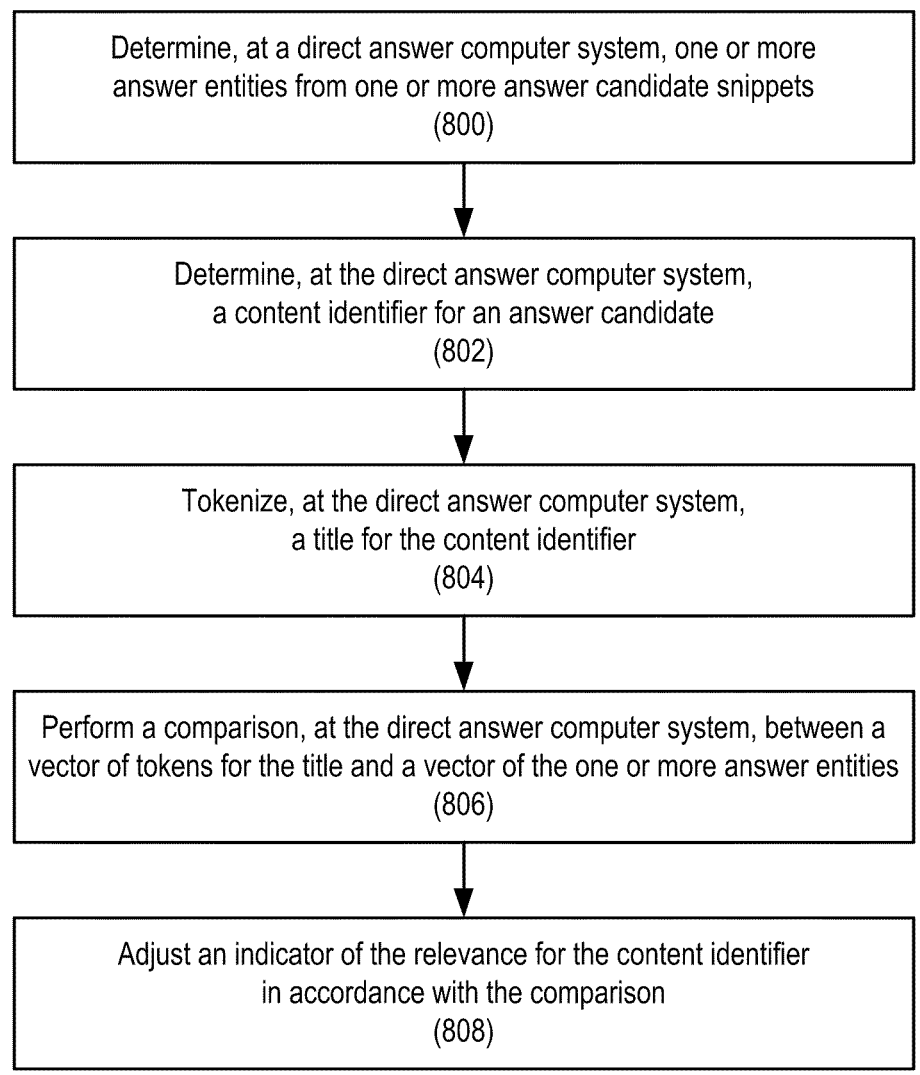
FIG. 8 depicts an exemplary flowchart for an implementation of determining a relevant content identifier.

FIG. 8 depicts an exemplary flowchart for an implementation of determining a relevant content identifier. An implementation of the DAFS system 202 may be used to determine a relevant content identifier. A relevant content identifier may be a content identifier that is relevant to the search being performed. Initially, one or more answer entities from one or more answer candidate Snippet(s) 222 are determined (800). For example, answer entities "Uncle Tom's Cabin," "Harriet Beecher Stowe," etc. may be found in the Snippet depicted in FIG. 12. Patterns may be used to determine the answer entities within an answer candidate Snippet 222. Next, a content identifier is determined for an answer candidate (802). The Snippet 222 may provide or identify a content identifier, such as a URL, for the answer candidate.

Next, a title for the content identifier may be tokenized (804). A title for the content identifier may be designated in a source file for a web page that can be located with the content identifier. A source file is text file that is used for display of a web page. The source file may be written in a markup language and/or generated. The title may be tokenized using a lexer. The lexer may identify the words, numbers, symbols, and phrases within the title and assign a token for each in order to identify the words, numbers, symbols, and phrases. Regular expressions may be used to identify the tokens.

Next, a comparison may be performed between a vector of tokens for the title and a vector of the one or more answer entities (806). The comparison between the tokens and the answer entities may indicate how many tokens and entities are similar or nearly the same. An indicator for the relevance of the content identifier may be adjusted in accordance with the comparison (808).

Figure 9:
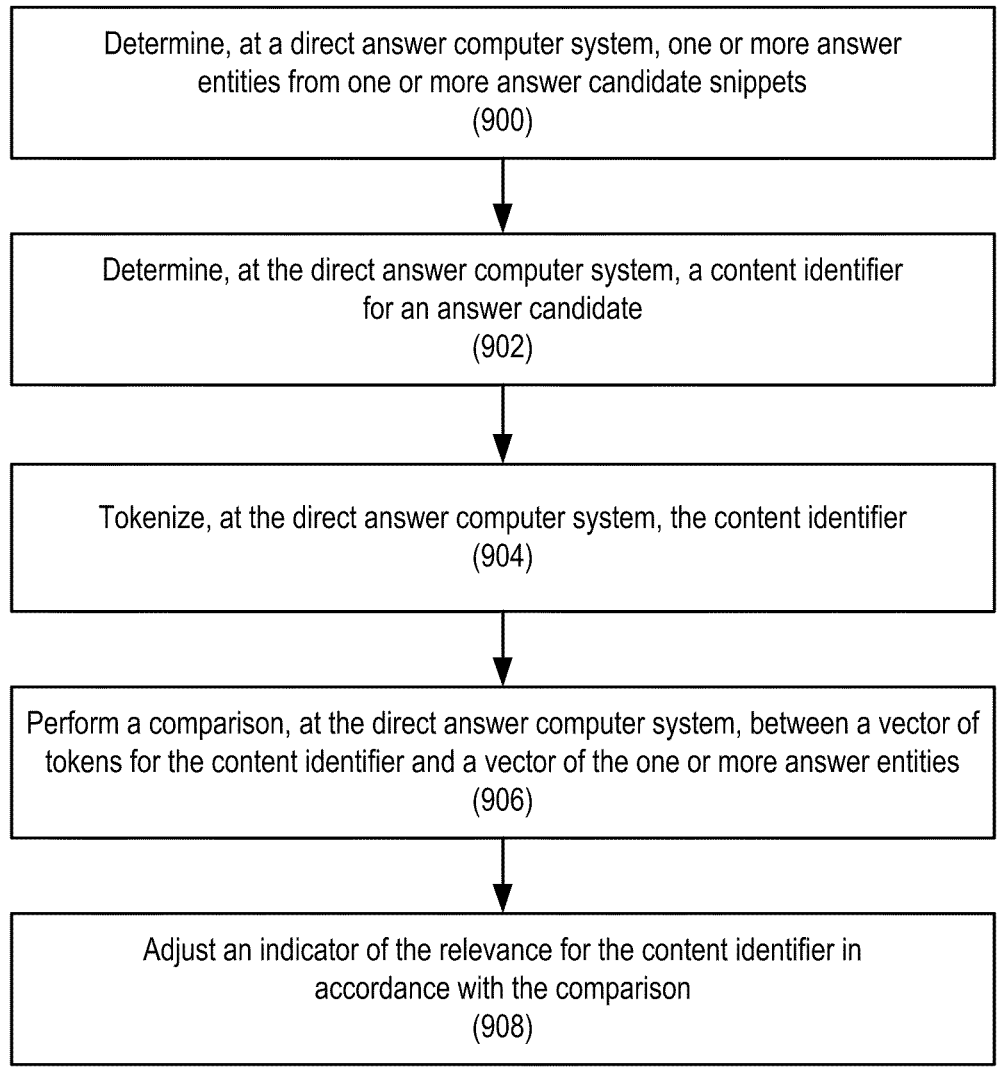
FIG. 9 depicts an exemplary flowchart for an implementation of determining a relevant content identifier.

FIG. 9 depicts an exemplary flowchart for an implementation of determining a relevant content identifier. An implementation of the DAFS system 202 may be used to determine a relevant content identifier. A relevant content identifier may be a content identifier that is relevant to the search being performed. Initially, one or more answer entities from one or more answer candidate Snippet(s) 222 are determined (900). Patterns may be used to determine the answer entities within an answer candidate Snippet 222. Next, a content identifier is determined for an answer candidate (902). The Snippet 222 may provide or identify a content identifier, such as a URL, for the answer candidate.

Next, a content identifier for the answer candidate may be tokenized (904). A lexer, patterns, and/or regular expressions may be used to tokenize the content identifier for the answer candidate. A comparison may be performed between a vector of tokens for the content identifier and a vector of the one or more answer entities (906). An indicator of the relevance for the content identifier may be adjusted in accordance with the comparison (908).

Figure 10A:
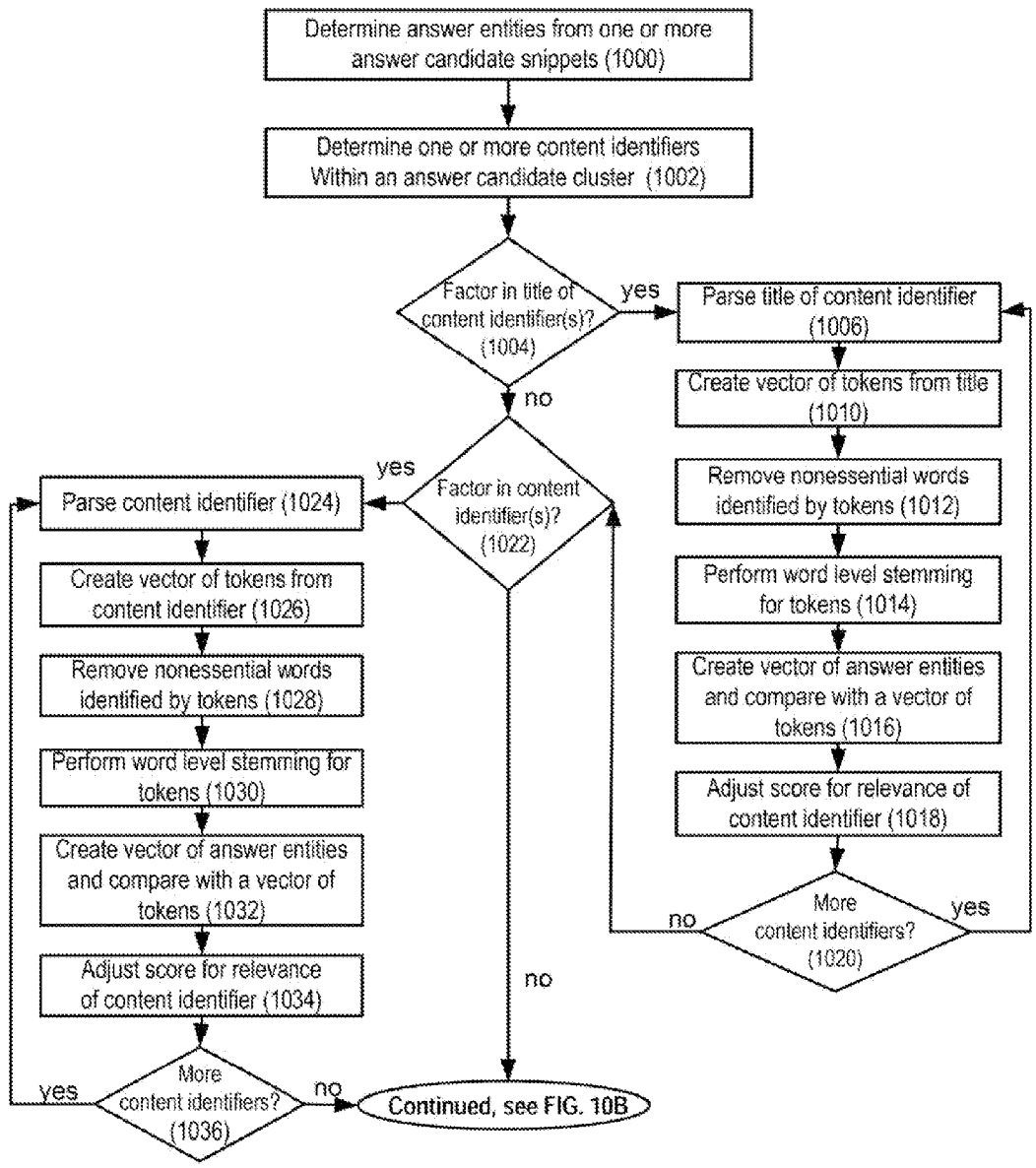
FIG. 10A depicts an exemplary flowchart for an implementation of determining a relevant content identifier.

FIG. 10A depicts an exemplary flowchart for an implementation of determining a relevant content identifier. Initially, answer entities may be determined from one or more answer candidate Snippet(s) 222 (1000). One or more content identifiers within an answer candidate cluster may be determined (1002). A set of content identifiers and/or all content identifiers for an answer candidate may be selected for a determination of the most relevant content identifier for the answer candidate. Those skilled in the art will recognize that any set of content identifiers may be selected for determining a relevant content identifier out of the set.

Next, a determination is made as to whether to factor in the title of content identifiers in a determination of a relevant content identifier (1004). If the title for the content identifier is factored in to determining content identifier relevance (1004), then the title of the content identifier may be parsed (1006). The parser may include a lexer, patterns, regular expressions, scripts, or any other process for determining the tokens within a title for the content identifier. A vector of tokens may be created for the title of the content identifier (1010). Nonessential words may be may be removed from the vector of tokens (1012). Tokens that do not convey a keyword, topic, or category may be removed. For example, tokens for "a," "the," and "and" may be removed because the tokens may not convey a keyword that would help with determining relevance of a content identifier.

Next, word level stemming may be performed (1014). Word level stemming may involve normalizing verbs to remove a tense. For example, "running" may become "run" for determining the relevance of a content identifier. Word level stemming may include eliminating an indication of a plural noun and/or possession. For example, "nuclei" may become "nucleus" for determining the relevance of a content identifier.

A vector of answer entities may be created and compared with a vector of tokens (1016) and a score may be adjusted in accordance with the comparison (1018). The score may be increased for each overlap between the vector of answer entities and vector of tokens. Next, a determination is made as to whether there are more content identifiers for determining a relevant content identifier (1020) and if there are more content identifiers, then the process repeats (1006).

Alternatively, if there are no more content identifiers (1020) or the title was not factored in to the relevance of a content identifier (1004), then a determination is made as to whether to factor in the content identifier (1022).

If the content identifier itself (e.g. a URL) is to be factored in to the relevance of content identifiers (1022), then the content identifier is parsed (1024). For example, a URL, such as "www.ask.com/a/b/c" may be parsed into "www," "ask," "com," "a," "b," and "c." A vector of tokens may be created for the title of the content identifier (1026). Nonessential words may be may be removed from the vector of tokens (1028). Tokens that do not convey a keyword, topic, or category may be removed. For example, "www" and "com" may be removed from the vector of tokens from the content identifier. Next, word level stemming may be performed (1030). A vector of answer entities may be created and compared with a vector of tokens (1032) and a score may be adjusted in accordance with the comparison (1034). The score may be increased for each overlap between the vector of answer entities and vector of tokens. Next, a determination is made as to whether there are more content identifiers for determining a relevant content identifier (1036) and if there are more content identifiers, then the process repeats (1024).

Figure 10B:
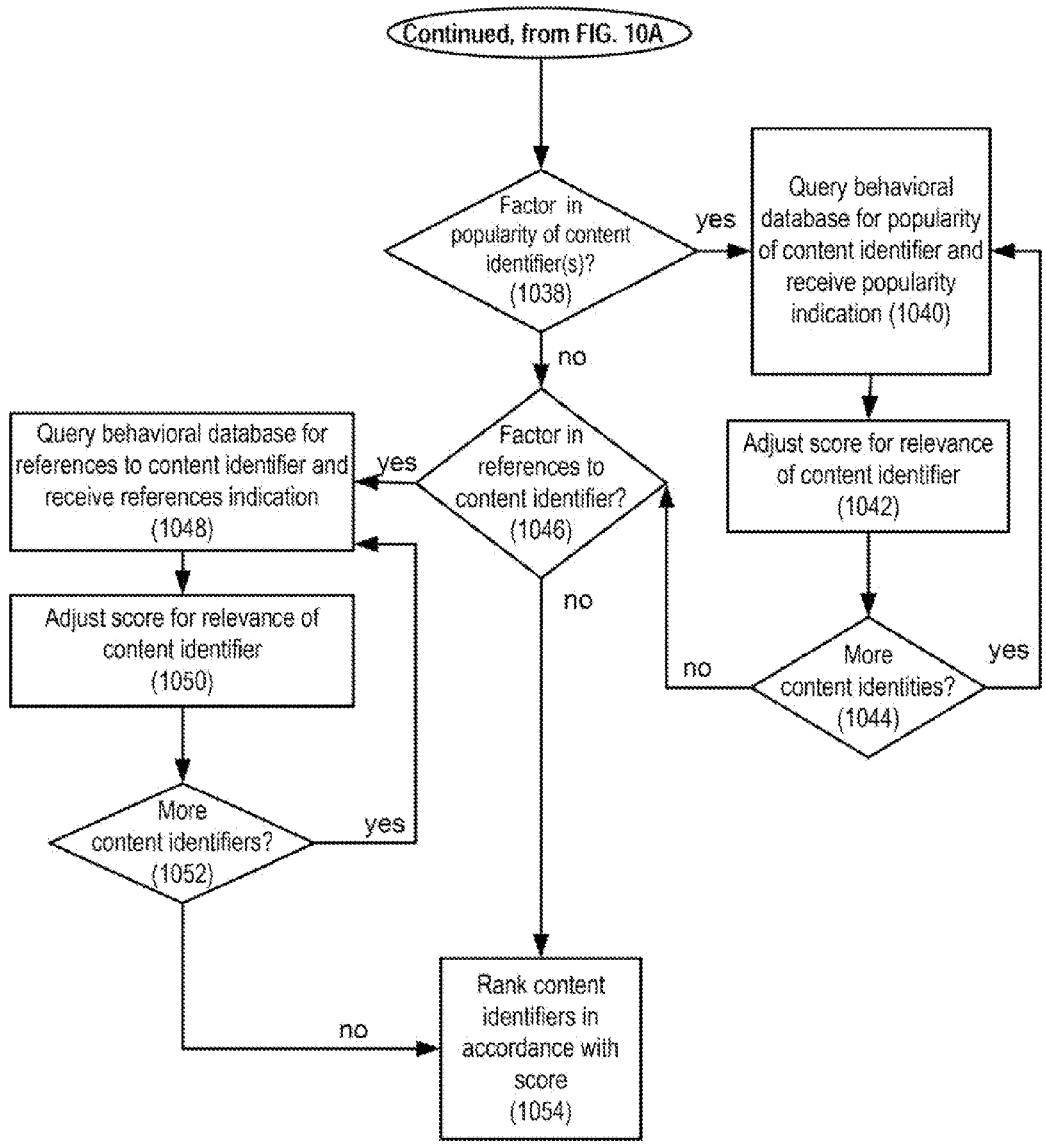
FIG. 10B depicts an exemplary flowchart for an implementation of determining a relevant content identifier.

Alternatively, FIG. 10B depicts a continuation of an exemplary flowchart for an implementation of determining a relevant content identifier. Initially, a determination is made as to whether to factor in the popularity of a content identifier (1038). If the popularity of the content identifier is factored in (1038), then the behavioral database for popularity of a content identifier is queried (1040). An indication of the popularity of the content identifier may be received from the database (1040). The indication of the popularity of the content identifier may provide an indication of the popularity of the web page associated with the content identifier and the popularity of a main website and/or a common root for a content identifier. For example, the indication of popularity for a content identifier may be a click count for an article within cnn.com and a click count for "www.cnn.com." A click count is a number that indicates popularity for a webpage or website. Continuing with the example, click count for the main website for a web page may be an aggregate of the click counts for all webpages or content available at "cnn.com." In one or more embodiments, the click count is an estimation of how many times the page is accessed. The score of the relevance of the content identifier may be adjusted in accordance with the popularity of the content identifier (1042). Next, a determination is made as to whether there are more content identifiers for determining the relevance of a content identifier (1044). If there are more content identifiers (1044), then the process repeats (1040).

Alternatively, if the popularity of a content identifier is not factored in (1038), then a determination is made as to whether to factor in references to the content identifier (1046). References to the content identifier may include web pages that link to the content identifier or reference the content identified by the content identifier. If the popularity of references the content identifier is factored in (1046), then the behavioral database for references to a content identifier is queried (1048). An indication of the popularity of the content identifier may be received from the database (1048). The score of the relevance of the content identifier may be adjusted in accordance with the popularity of the content identifier (1050). Next, a determination is made as to whether there are more content identifiers for determining the relevance of a content identifier (1052). If there are more content identifiers (1052), then the process repeats (1048).

Alternatively, if there are no more content identifiers (1052) or references to content identifiers are not factored (1046), then the content identifiers are ranked in accordance with the relevance score for the content identifier (1054). The most relevant content identifier for an answer candidate may be presented with the answer with the Presentation Module 232.

Figure 11:
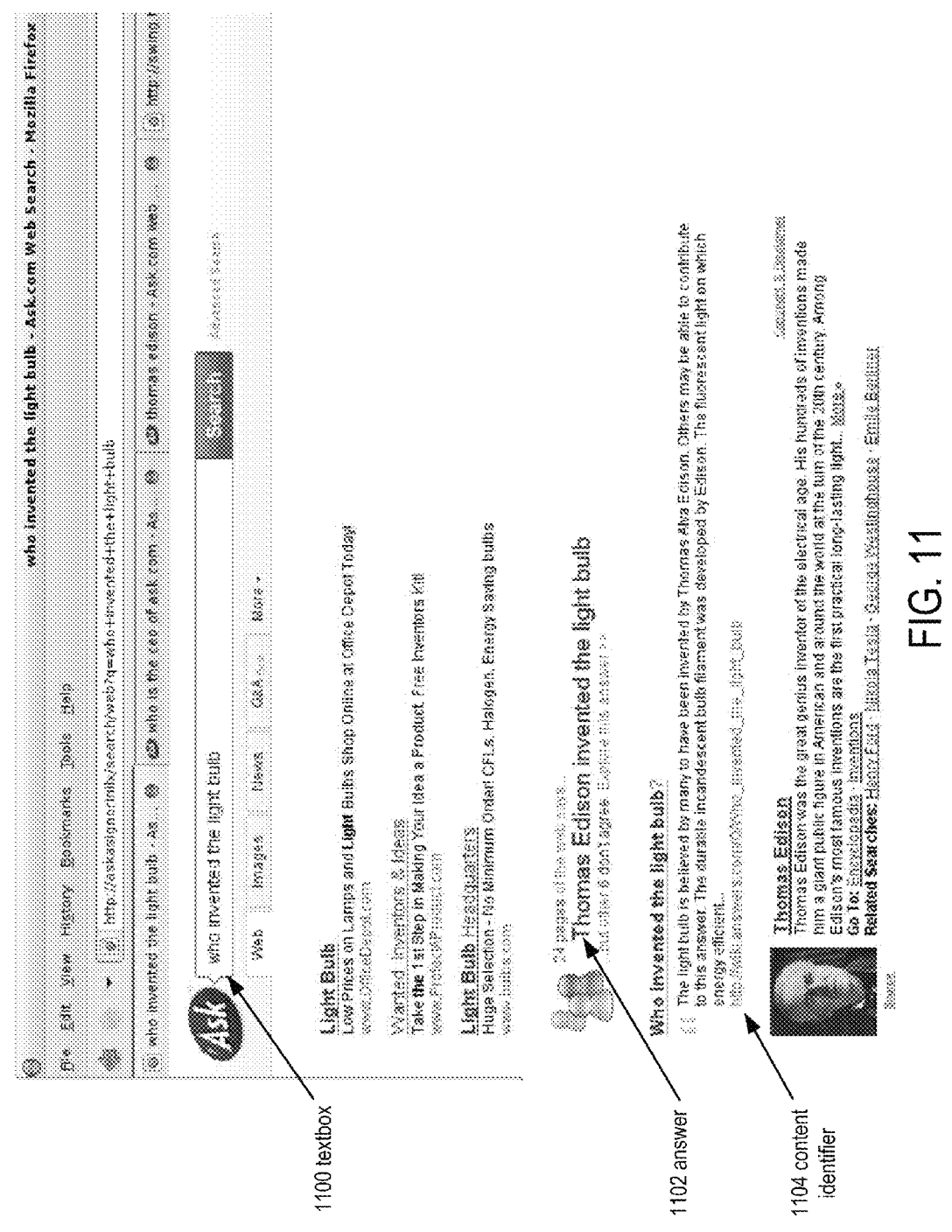

FIG. 11 depicts an exemplary Interface in accordance with an embodiment of an intelligent search system. The Interface 204 depicted in FIG. 11 provides a text input box 1100 for input of a search query. The search results are displayed with an answer 1102 and a relevant content identifier 1104 for the answer.

FIG. 12 depicts an exemplary Snippet in accordance with an embodiment of an intelligent search system. The Snippet 222 provides a title, a description, a content identifier (e.g. URL) and a portion of content for the content identifier.

Figure 13:
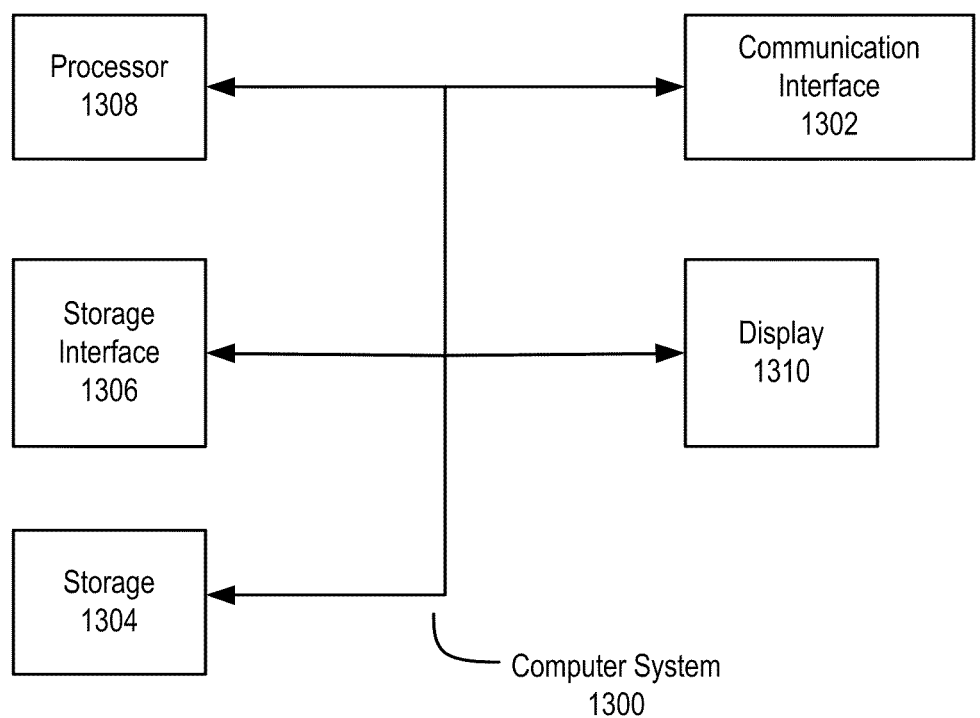
FIG. 13 depicts an exemplary block diagram for an architecture of a computer system.

FIG. 13 depicts an exemplary block diagram for a system architecture of a computer system. The execution of instructions to practice the invention may be performed by any number of computer systems 1300 as depicted in FIG. 13. As used herein, the term computer system is broadly used to describe any computing device that can store and independently run one or more programs, applications, scripts, or software processes. Implementations of the present invention may have a single computer system 1300 or any number of computer systems 1300.

Computer systems 1300 may communicate with other computer systems/devices with any number of Communication Interface(s) 1302. The Communication Interface 1302 may provide the ability to transmit and receive signals, such as electrical, electromagnetic or optical signals, that include data streams representing various types of information (e.g. messages, communications, instructions, and data). The Communication Interface 1302 may provide an implementation for a communication protocol, such as a network protocol. Instructions may be executed by a Processor 1308 upon receipt and/or stored in Storage 1304 accessible to the Computer System 1300.

Storage 1304 may be accessed by the Computer System 1300 with a Storage Interface 1306. The Computer System 1300 may use the Storage Interface 1306 to communicate with the Storage 1304. The Storage Interface 1306 may include a bus coupled to the storage and able to transmit and receive signals. Storage 1304 may include random access memory (RAM) or other dynamic storage devices, for storing dynamic data and instructions executed by the Processor 1308. Any number of Processor(s) 1308 may be used to execute instructions for the Computer System 1300. Storage may include, but is not limited to, read only memory (ROM), magnetic disks, flash drives, usb drives, and optical disks. In one or more embodiments, a Computer System 1300 may be connected to a Display 1310 for displaying information to a user.

"Computer usable medium" or "Computer-readable medium" refers to any medium that provides information and/or may be used by a Processor 1308. Medium may include volatile and non-volatile storage mediums.

Various embodiments of the present invention may be implemented with the aid of computer-implemented processes or methods (e.g. programs or routines) that may be rendered in any computer language including, without limitation, C#, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of this detailed description are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by an executing computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for determining confidence in an answer in response to search request, comprising:
   receiving, at a direct answer computer system, a search query over a network;
   receiving, at the direct answer computer system, one or more answer candidate snippets for the search query, wherein an answer candidate snippet comprises at least a portion of content available over the network for an answer candidate;
   determining, at the direct answer computer system, one or more answer entities within a selected answer candidate snippet;
   determining, at the direct answer computer system, a frequency of the one or more answer entities found within the one or more answer candidate snippets for the search query;
   adjusting, at the direct answer computer system, a confidence score for the selected answer candidate in accordance with the frequency of the one or more answer entities found within the one or more answer candidate snippets;
   querying, at the direct answer computer system, a reference site database with the search query;
   determining, at the direct answer computer system, a plurality of reference site entities within a query result received from the reference site database;
   determining, at the direct answer computer system, a frequency of the a plurality answer entities found within the plurality of reference site entities; and
   adjusting, at the direct answer computer system, the confidence score for the selected answer candidate in accordance with the frequency of the one or more answer entities found within the one or more reference site entities, wherein the confidence score is increased each time an answer entity in a selected answer candidate snippet is found within another answer candidate snippet;
   ranking, at the direct answer computer system, the candidate snippets basd on the confidence score as adjusted; and
   sending, at the direct answer computer system, at least one answer candidate snippet for a response to the search query.

2. The method of claim 1, wherein the answer candidate snippet comprises a content identifier, a title, and a description.

3. The method of claim 1, further comprising:
   determining, at the direct answer computer system, one or more search term entities within one or more related search queries;
   determining, at the direct answer computer system, a frequency of the one or more answer entities found within the one or more search term entities; and
   adjusting, at the direct answer computer system, the confidence score for the selected answer candidate in accordance with the frequency of the one or more answer entities found within the one or more search term entities.

4. A method for determining confidence in an answer in response to search request, comprising:
   receiving, at a direct answer computer system, a search query over a network;
   receiving, at the direct answer computer system, one or more answer candidate snippets for the search query, wherein an answer candidate snippet comprises at least a portion of content available over the network for an answer candidate;
   determining, at the direct answer computer system, one or more answer entities within a selected answer candidate snippet;
   sending, from the direct answer computer system, a query request to a behavioral database, the query request comprising a request for a plurality of related search queries to the search query;
   receiving, at the direct answer computer system, a query result from the behavioral database, the query result comprising the plurality of related search queries to the search query;
   determining, at the direct answer computer system, a plurality of search term entities within the one or more related search queries;
   determining, at the direct answer computer system, a frequency of the plurality of answer entities found within the one or more search term entities;
   adjusting, at the direct answer computer system, a confidence score for the selected answer candidate in accordance with the frequency of the one or more entities found within the one or more search term entities;
   ranking the candidate snippets based on the confidence score as adjusted; and
   sending at least one answer candidate snippet for a response to the search query.

5. The method of claim 4, wherein the answer candidate snippet comprises a content identifier, a title, and a description.

6. The method of claim 4, further comprising:
   querying a reference site database with the search query;
   determining one or more reference site entities within a query result received from the reference site database;
   determining a frequency of the one or more answer entities found within the one or more reference site entities; and
   adjusting the confidence score for the selected answer candidate in accordance with the frequency of the one or more answer entities found within the one or more reference site entities.

7. The method of claim 4, wherein the confidence score for the selected answer candidate is increased each time at least one of the one or more entities is found within the one or more search term entities.

8. The method of claim 4, wherein the confidence score is increased each time an answer entity in a selected answer candidate snippet is found within another answer candidate snippet.

9. A system for determining confidence in an answer in response to search request, comprising:
   an interface to receive a search query over a network and send at least one answer candidate snippet for a response to the search query;
   an information retrieval module to receive one or more answer candidate snippets for the search query, wherein an answer candidate snippet comprises at least a portion of content available over the network for an answer candidate;

a confidence module to determine one or more answer entities within a selected answer candidate snippet and a frequency of the one or more answer entities found within the one or more answer candidate snippets for the search query, and adjust a confidence score for the selected answer candidate in accordance with the frequency of the one or more answer entities found with the one or more answer candidate snippets;

a reference site database to query with the search query, wherein the confidence module determines one or more reference site entities within a query result received from the reference site database, a frequency of the one or more answer entities found within the one or more reference site entities, and adjusts the confidence score for the selected answer candidate in accordance with the frequency of the one or more answer entities found within the one or more reference site entities, wherein the confidence score is increased each time an answer entity in a selected answer candidate snippet is found within another answer candidate snippet; and a presentation module ranking the candidate snippets based on the confidence score as adjusted.

10. The system of claim 9, wherein the answer candidate snippet comprises a content identifier, a title, and a description.

11. The system of claim 9, wherein the confidence module determines one or more search term entities within one or more related search queries, a frequency of the one or more answer entities found within the one or more search term entities, and adjusts the confidence score for the selected answer candidate in accordance with the frequency of the one or more answer entities found within the one or more search term entities.

12. A system for determining confidence in an answer in response to search request, comprising:

an interface to receive a search query over a network and send at least one answer candidate snippet for a response to the search query;

an information retrieval module to receive one or more answer candidate snippets for the search query, wherein an answer candidate snippet comprises at least a portion of content available over the network for an answer candidate; and a confidence module to determine one or more answer entities within a selected answer candidate snippet;

a behavioral database to receive a query request comprising a request for a plurality of related search queries to the search query, wherein the confidence module receives a query result from the behavioral database with the plurality of related search queries to the search query and determines one or more search term entities within the plurality of related search queries, wherein the confidence module determines a frequency of a plurality of answer entities found within the plurality of search term entities and adjusts a confidence score for the selected answer candidate in accordance with the frequency of the plurality of entities found within the one or more search term entities and a presentation module ranking the candidate snippets based on the confidence score as adjusted.

13. The system of claim 12, wherein the answer candidate snippet comprises a content identifier, a title, and a description.

14. The system of claim 12, further comprising:

a reference site database to query with the search query, wherein the confidence module determines one or more reference site entities within a query result received from the reference site database, a frequency of the one or more answer entities found within the one or more reference site entities, and adjusts the confidence score for the selected answer candidate in accordance with the frequency of the one or more answer entities found within the one or more reference site entities.

15. The system of claim 12, wherein the confidence score for the selected answer candidate is increased each time at least one of the one or more entities is found within the one or more search term entities.

16. The system of claim 12, wherein the confidence score is increased each time an answer entity in a selected answer candidate snippet is found within another answer candidate snippet.

* * * * *